United States Patent

Maddock

[15] 3,658,660
[45] Apr. 25, 1972

[54] ARTICLES SUCH AS ELECTROFORMS AND METHOD OF MAKING SAME

[72] Inventor: Herbert Fernyhough Maddock, 26 Garth Drive, Chester, England

[22] Filed: Aug. 29, 1969

[21] Appl. No.: 854,207

[30] Foreign Application Priority Data

Aug. 30, 1968 Great Britain .................... 41,442/68

[52] U.S. Cl. .................................................. 204/4, 204/3
[51] Int. Cl. ....................................... C23b 7/00, C23b 7/08
[58] Field of Search ............................................. 204/3, 4, 9

[56] References Cited

UNITED STATES PATENTS

| 2,592,614 | 4/1952 | Stoddard, Jr. | 204/3 |
| 3,513,282 | 5/1970 | Fox | 204/143 |

FOREIGN PATENTS OR APPLICATIONS 750,633   6/1956   Great Britain

OTHER PUBLICATIONS

Don' t Overlook Electroforming by W. H. Safranek Product Engineering, June 5, 1961.
Electroforming Diffiuclt Shapes by W. H. Prine Product Engineering, December, 1948 Vol. 19, No. 12, pp. 86– 89.

Primary Examiner—John H. Mack
Assistant Examiner—T. Tufariello
Attorney—Cushman, Darby & Cushman

[57] ABSTRACT

Electroforms are produced by depositing a metal or alloy on a mold or mandrel of a metal or alloy having a melting point lower than the metal deposited in the disclosed method. A tin/zinc alloy of 92 percent tin and 8 percent zinc is coated with a metal such as copper or nickel, then the mold is immersed in a liquid maintained at a temperature sufficient to melt away the mold leaving the electroformed article.

10 Claims, 2 Drawing Figures

Patented April 25, 1972 3,658,660
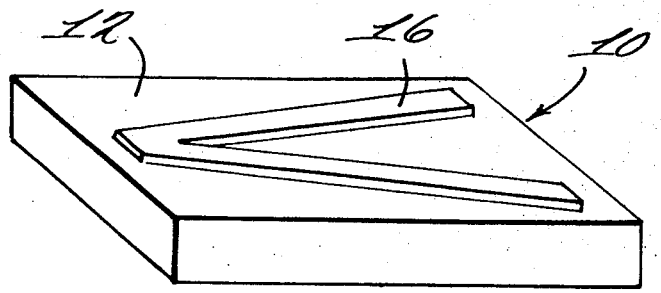
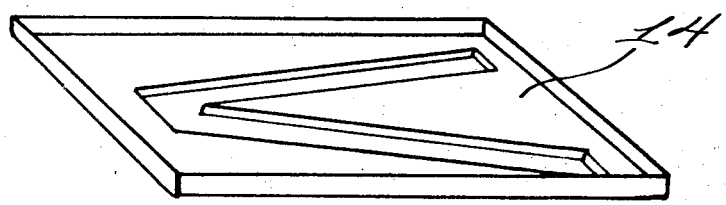

ARTICLES SUCH AS ELECTROFORMS AND METHOD OF MAKING SAME

The present invention relates to the production of articles such as electroforms which may be used for example as electrodes for use in electromachining such for example as either spark machining or electrochemical machining.

Electroforms or electrodes for use in electromachining can be produced by electroforming techniques, by chemical deposition or by electroless forming processes in which a deposit is produced on a mold or mandrel which is subsequently eliminated.

It has been proposed to use molds or mandrels in electro or other deposition methods which consist of a relatively low melting point metal or alloy, but it has not been possible to completely eliminate residues of the mold or mandrel material without damaging the resulting electroform.

The object of the present invention is to provide a method of producing electroforms which overcomes the aforementioned disadvantage.

According to the present invention a method of producing electroforms comprises the step of producing a mold or mandrel from a metal or alloy and electrolytically depositing thereon one or more coatings of metal or alloy having a higher melting point than the metal or alloy forming the mold or mandrel, the coating metal or alloy being such that it does not have an affinity for the metal or alloy of the mold or mandrel.

Preferably the mold or mandrel is removed from the coating or coatings by immersing the coated mold or mandrel in a liquid or mandrel metal or alloy, but below that of the coating or coatings.

The removal of the mold or mandrel from the coating or coatings may be assisted by effecting relative movement of the liquid and the coated mold or mandrel.

Preferably the liquid is oil, and the coating or coatings may be chemically treated to remove mold or mandrel residue.

The mold or mandrel is preferably made from an alloy of tin and zinc, whilst the coating or coatings are of copper.

Preferably the tin and zinc alloy comprises 92 percent tin and 8 percent zinc, each plus or minus 0.2 percent, impurities not exceeding 0.05 percent.

In order that the invention can be understood and readily carried into effect the method according to the invention will now be described, by way of example only, with reference to the accompanying drawings, in which:

FIG. 1 is a diagrammatic perspective view of a mold or mandrel for use in the manufacture of an electroform in accordance with the invention, and:

FIG. 2 is a diagrammatic perspective view of an electroform produced by employing the mold or mandrel shown in FIG. 1 of the drawings.

Referring to the drawings the mold or mandrel 10 shown in FIG. 1 is cast from an alloy of tin and zinc, the proportions of which are 92 percent tin plus or minus 0.2 percent and 8 percent zinc plus or minus 0.2 percent. Impurities preferably should not exceed 0.05 percent.

The mold or mandrel is provided with a surface 12 corresponding to the working surface of the electrode 14 shown in FIG. 2, and raised portions 16 are provided on the surface 12.

An insulating member, not shown, is then placed on the mold or mandrel 10 so as to mask the whole of the mold with the exception of the surface 12.

The mold or mandrel is then placed in an air agitated electrolytic plating bath containing copper pyrophosphate. Plating is commenced, and continued until a smooth covering of copper has been deposited on the surface 12 only.

The mold or mandrel is then removed from the bath and the insulating member removed after which the mold is immersed in a hot oil bath which is at a temperature lying above the melting point of the tin/zinc alloy, that is 250° C, but below the melting point of the copper coating.

Removal of the melted alloy may be promoted by rotating or spinning the electroform to assist elimination of melted metal.

Any residue of the alloy remaining on the electroform may be eliminated by washing the electroform in a caustic soda solution or in a hydrochloric acid solution.

It has been found that the tin/zinc alloy does not have an affinity for the copper deposit whereby particles of the alloy remain in the copper, thus resulting in a porous electroform.

It will thus be apparent that when producing an electroform by the method according to the invention, the metal or alloy chosen for the mould or mandrel must be such that it does not have an affinity for the coating metal which may be other than copper, for example nickel, but the tin/zinc alloy may be substantially eutectic and is highly fluid when heated to a temperature above its melting point, and can thus be easily eliminated from the coating. Also any trace elements of the tin/zinc alloy accidentally left on the electroform do not attach the electroform.

What we claim is:

1. A method of producing an electroform comprising the steps of producing a fusible mold or mandrel from an alloy of tin and zinc and electrolytically depositing thereon one or more coatings of metal or alloy having a higher melting point than said tin and zinc alloy forming the mold or mandrel, the coating metal or alloy being such that it does not have an affinity for the tin and zinc alloy of the mold or mandrel.

2. A method of producing an electroform as claimed in claim 1, in which the mold or mandrel is removed from the coating or coatings by immersing the coated mold or mandrel in a liquid having a temperature above the melting point of that of the mold of mandrel tin and zinc alloy, but below the melting point of that of the coating or coatings, thereby removing substantially all of the tin/zinc alloy mold or mandrel by melting same.

3. A method of producing an electroform as claimed in claim 2, in which removal of the mold or mandrel from the coating or coatings is assisted by effecting relative movement of the liquid and the coated mold or mandrel.

4. A method of producing an electroform as claimed in claim 3, in which the liquid is oil.

5. A method of producing an electroform as claimed in claim 2, in which the coating or coatings, after removal of the mold or mandrel are treated chemically to remove any remaining mold residue.

6. A method of producing an electroform as claimed in claim 1, in which the coating or coatings are copper.

7. A method of producing an electroform as claimed in claim 1, in which the tin/zinc alloy comprises 92 percent tin plus or minus 0.2 percent, and 8 percent zinc plus or minus 0.2 percent, impurities not exceeding 0.05 percent.

8. An electroform produced according to the method of claim 1.

9. A method producing an electroform comprising the steps of:
   a. producing a mold or mandrel from a tin/zinc alloy consisting essentially of tin $92 \pm 0.2$ percent, zinc $8 \pm 0.2$ percent and impurities, if present, not exceeding 0.05 percent;
   b. depositing thereon at least one metal having a melting point higher than the tin/zinc alloy of step (a) and substantially free from affinity for said mold or mandrel;
   c. immersing the coated mold or mandrel in a liquid maintained at a temperature above the melting point of said tin/zinc alloy but below the melting point of said deposited coating; thereby removing the coating from the mold or mandrel.

10. The method as claimed in claim 9 wherein the deposited coating is copper.

* * * * *

UNITED STATES PATENT OFFICE
CERTIFICATE OF CORRECTION

Patent No. 3,658,660    Dated April 25, 1972

Inventor(s) Herbert Fernyhough Maddocks

It is certified that error appears in the above-identified patent and that said Letters Patent are hereby corrected as shown below:

Please correct the spelling of Inventor's surname to --Maddocks--.

Signed and sealed this 17th day of October 1972.

(SEAL)
Attest:

EDWARD M. FLETCHER, JR.                ROBERT GOTTSCHALK
Attesting Officer                     Commissioner of Patents